United States Patent Office 3,486,961
Patented Dec. 30, 1969

3,486,961
CONTINUOUS METHOD FOR MAKING A POLY-
TETRAFLUOROETHYLENE LAMINATE
Roger J. Adams, St. Paul, Minn., assignor to Minnesota
Mining and Manufacturing Company, St. Paul, Minn.,
a corporation of Delaware
Continuation-in-part of application Ser. No. 547,897,
May 5, 1966. This application July 27, 1966, Ser.
No. 573,736
Int. Cl. B32b 15/08, 27/36
U.S. Cl. 156—306                                    4 Claims

ABSTRACT OF THE DISCLOSURE

A substrate such as metal or ceramic is provided with a tightly bonded substantially void-free surface of polytetrafluoroethylene (TFE) by superposing an unsintered fibroid porous TFE film, a fluorinated ethylene propylene copolymer (FEP) film, and the substrate, and passing the assembly through heated rolls which sinter the TFE, melting the FEP and bonding it to the substrate.

---

This application is a continuation-in-part of my copending application Ser. No. 547,897, filed May 5, 1966, now abandoned.

This invention relates to laminates comprising perhalocarbon films and to methods of making such laminates. Polytetrafluoroethylene resin (PTFE, or, hereinafter, TFE) is essentially unique in its combination of properties. Resistant to heat, solvents, moisture and impact, unreceptive to most coatings, possessing low friction and outstanding electrical properties, this polymer has found wide use in chemical containers, cooking equipment, electrical installations, and in other applications where severe operating conditions are likely to be encountered.

Interestingly enough, the use of polytetrafluoroethylene resin has been restricted, to a large extent by its own intractable nature. Even forming a film of this polymer is difficult, since, although nominally a thermoplastic, it has an extremely high melt viscosity (on the order of $10^{10}$ poises) and a fusion temperature very close to its decomposition temperature, thereby essentially precluding the possibility of forming it by melt extrusion. In fact, making any shaped solid polytetrafluoroethylene article involves the steps of cold-forming the polymer from powder, sintering the powder, and cooling. Films are thus formed either by skiving from a sintered block or by extruding a sheet comprising a mass of powder and liquid carrier such as deodorized kerosene, removing the carrier, and sintering the sheet.

Laminating TFE to a substrate raises another set of problems. Since it can neither be coated from a true solution nor applied as a hot melt, and since it is notoriously unreceptive to adhesives, other measures must be adopted. One way is to apply powdered TFE to a heated substrate and thereafter sinter it. Although relatively simple, this process is slow, and the resultant coating tends to be porous and susceptible to staining, uneven, limited in thickness if "mud cracking" is to be avoided, and low in tensile strength. Another way is to prime a sintered TFE film with a reactive alkaline earth metal, e.g., as taught in U.S. Patent 2,789,063, and thereafter bond it to a substrate with a separate adhesive; although workable, this process is expensive and adequate adhesion is obtained only after several minutes under pressure. Still another way is to use some more tractable fluorocarbon resin such as fluorinated ethylene:propylene copolymer (FEP), placing a 3-ply assembly of TFE, FEP, and substrate in a heated platen press for perhaps five minutes or more. This technique is also slow and expensive; additionally, it does not lend itself to producing continuous laminates.

The desirability of quickly and firmly bonding TFE to a substrate has been recognized, but not heretofore readily accomplished. To the best of my knowledge, there has never previously existed any method of bonding TFE to a substrate in 10 seconds or less to provide a smooth, pore-free stain-resistant surface with adhesion on the order of at least 15 lbs. per inch (2.7 kg./cm.) of width, so as to prevent inadvertent removal of the TFE under the stresses encountered in normal conditions of use. My invention, which provides such a method, also provides a novel laminate having great versatility, as will now be shown.

I have previously referred to the various methods of forming solid sintered TFE film. My invention employs a porous TFE sheet, made typically by blending submicron TFE powder with deodorized kerosene and, if desired, pigment, ram extruding a sheet having perhaps ten times the thickness desired, calendering at a temperature up to 65° C. in several passes to reduce the thickness to that desired, and removing the deodorized kerosene. The calendered sheet is relatively weak and slippery, microscopic examination revealing a fibroid structure in which elongated fibers, perhaps 1–3 microns in diameter, are lightly bonded together in a structure containing on the order of 30% voids. This structure is quite directional, or anisotropic, the fibers generally being aligned in the direction of calendering. Sheets of this type shrink significantly when sintered, the fibers coalescing to eliminate substantially all voids; nevertheless, the fibroid and anisotropic structure remains and is readily observed under the microscope, especially in polarized light.

In accordance with a preferred form of my invention, I form a laminate comprising an unsintered TFE sheet, or layer, of the type described in the preceding paragraph and a heat-softenable adhesive layer, especially a film of FEP. This is conveniently accomplished by superposing a layer of unsintered TFE and a layer of FEP, applying pressure, and heating the FEP above its fusion temperature. Such heating causes the FEP to migrate into the interstitial portion of the TFE layer immediately adjacent the contiguous faces to a depth of several TFE fibers, typically on the order of about 1 mil (0.025 mm.), depending on time, temperature, and pressure, but to a depth less than the total thickness of the TFE layer. Either concurrently or subsequently the TFE is heated above its sintering temperature, causing the remainder of the voids, i.e., those not occupied by the FEP, to be eliminated. When the unsintered TFE layer is initially 3 mils (0.08 mm.) thick and contains 30% voids, the resultant laminate is such that the FEP occupies about half of the voids originally present. After sintering, the TFE surface is smooth, regular, and nonporous, although, as previously indicated, it retains a characteristic anisotropic and fibroid structure, readily distinguishable from that of a skived film under microscopic examination or tensile testing.

A 2-ply laminate formed from a porous fibroid TFE sheet in the manner just described, can be further laminated by placing the FEP surface in contact with a substrate and supplying sufficient heat and pressure to again fuse the FEP. When a multi-ply laminate is formed by sandwiching FEP between TFE and a substrate, the migration of the FEP into the TFE and the bonding of FEP to the substrate can be effected simultaneously. Appropriate selection of operating parameters makes it possible to sinter the TFE during lamination; alternatively, the TFE can be sintered by playing a flame over its surface following lamination.

If desired, a layer of FEP can be fusion-bonded to a substrate and a porous TFE film thereafter laminated to the FEP under conditions which permit the FEP to migrate into the interstitial voids adjacent the interface of the two polymers, the TFE being sintered as previously indicated.

As a further aid in understanding the invention, attention is directed to the accompanying drawings, in which.

Figure 1:
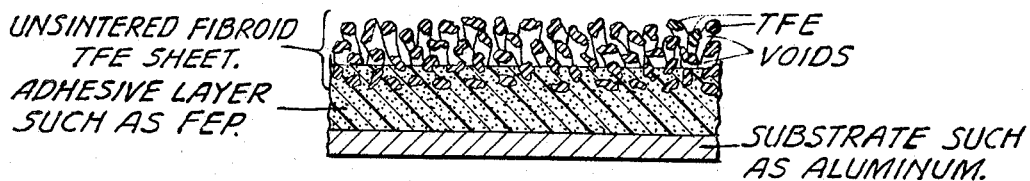
FIGURE 1 represents a greatly enlarged cross-sectional view of a laminate comprising an unsintered void-containing fibroid TFE sheet, an adhesive polymeric layer, and a substrate.
Figure 2:
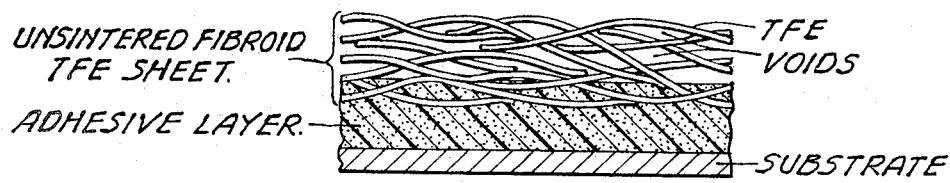
FIGURE 2 is a cross-sectional view of the laminate of FIGURE 1, taken at right angles thereto.
Figure 3:
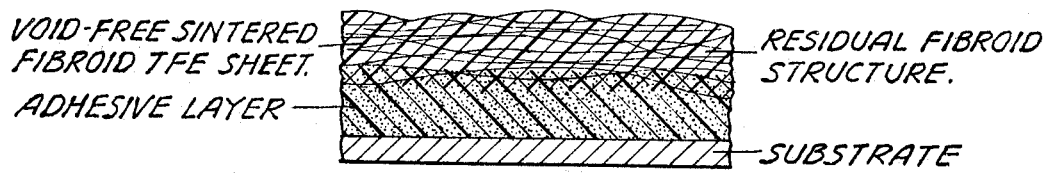
FIGURE 3 is a cross-sectional view of the laminate of FIGURE 2 after the TFE sheet has been sintered.
Figure 4:
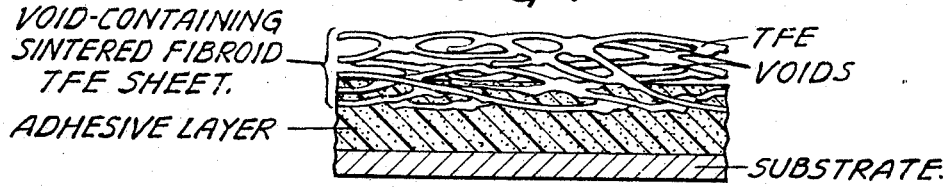
FIGURE 4 is a cross-sectional view of a laminate similar to that of FIGURE 3, the TFE sheet having been sintered, prior to lamination, in such a way as to retain the voids.
Figure 5:
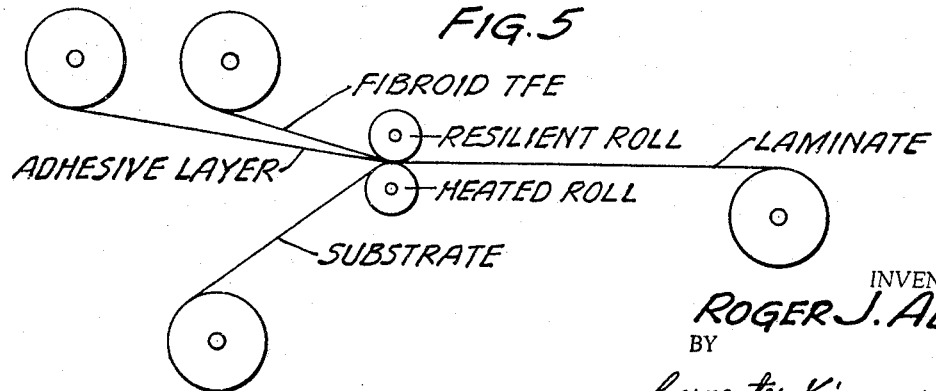
FIGURE 5 is a schematic view showing a preferred way of providing a flexible substrate with a TFE surface.

Specific embodiments of the invention will now be described by means of illustrative but non-limitative examples, in which all parts are by weight unless otherwise noted.

Preparation of unsintered polytetrafluoroethylene sheet

To a twin shell blender was added 83 parts of finely divided polytetrafluoroethylene (TFE) resin and 17 parts of deodorized kerosene. The resin was made up of individual particles, whose size was on the order of one micron or less, combined into agglomerates ranging from approximately 350 to 650 microns in diameter so that, although it had a specific gravity of 2.15–2.20, its bulk density was approximately 0.475. A suitable TFE resin powder is commercially available as "Teflon" Type 6C, from E. I. du Pont de Nemours & Co. The powdered resin and kerosene were then blended to form a paste, somewhat like wet sand, which was removed from the blender and aged for approximately 12 hours. The blended mass was then charged to a lead press and ram extruded to form a 100-mil (2.5 mm.) sheet which was fairly weak, but could be handled for purposes of processing. The sheet was then passed through consecutive sets of calender rolls to reduce its thickness to 10 mils (0.25 mm.), at which time its strength had increased somewhat, e.g., to about 500 p.s.i. (35 kg./cm.$^2$) in the lengthwise direction and approximately ⅓ that value in the cross direction. The kerosene was then removed by a solvent degreasing operation in trichloroethylene, after which the porosity of the sheet (determined either by toluene fill or by comparison of its volume to that of the sheet after sintering) was found to be approximately 30%. (A film of this type is commercially available from Minnesota Mining and Manufacturing Co. under the trade designation "3M" PTFE film, Type B.)

EXAMPLE 1

A 5-mil (0.12-mm.) FEP film having a melting point of about 270° C., a tensile strength of about 3000 p.s.i. (2.0 kg./cm.$^2$) and a density of about 2.15 (commercially available as "Teflon" FEP-fluorocarbon film, Type A, from E. I. du Pont de Nemours & Co.) was sandwiched between a 10-mil (0.25 mm.) sheet of unsintered TFE (prepared from "Teflon" Type 6C polytetrafluoroethylene, as described above) and a sheet of 20-gauge (0.8-mm.) Type 3003 aluminum and passed through a continuous laminator at 2 feet (60 cm.) per minute. The laminator comprised an 8-inch (20-cm.) silicone rubber roll and an 8-inch (20-cm.) aluminum-clad steel roll, the latter being electrically heated and maintained at a temperature of 800° F. (425° C.), with the aluminum ply in contact therewith. The two rolls were urged together to apply a force of 90 lbs. per inch (16 kg./cm.) of laminate width. After air-cooling at atmospheric pressure, the resultant laminate had a smooth, stain-resistant sintered TFE surface; stripback adhesion of the FEP to the TFE, measured generally in accordance with the procedures described in ASTM Test D1000, was found to be 22 lbs. per inch (4 kg./cm.) of width, which is roughly equal to the cohesive strength of the FEP and is considered extremely good. Infrared analysis of the separated films showed FEP still adhered to the surface of the TFE which had been adjacent thereto. Careful microscopic examination of a cross-section of the stripped TFE film revealed the presence of FEP to a depth of roughly 1 mil (0.025 mm.).

For reference, this Example 1 was repeated with several different types of 10-mil (0.25-mm.) TFE films. Where skived TFE film was used, the TFE-FEP bond was 7 lbs. per inch (1.2 kg./cm.) of width, and no FEP remained on the TFE. Where skived, sodium-etched TFE film was used, the TFE-FEP bond was 8 lbs. per inch (1.4 kg./cm.) of width. Where porous TFE film of the type used in Example 1 was sintered to eliminate voids prior to lamination, the TFE-FEP adhesion was only 4 lbs. per inch (0.7 kg./cm.) of width; where this film was sodium-primed after sintering, the TFE-FEP adhesion was 5 lbs. per inch (0.9 kg./cm.) of width. When lamination is carried out in a platen press over a 5-minute period, each of these films yields a fairly well-adhered laminate; such operations, however, are slow, expensive, inconvenient, and poorly suited for the production of continuous rolls.

EXAMPLE 2

The following laminates comprising TFE and aluminum sheet were formed:

(A) 4-mil (0.1-mm.) extruded porous TFE sheet prepared as described in the paragraph preceding Example 1, 5-mil (0.125-mm.) FEP film as in Example 1, and 40-mil (1-mm.) aluminum were laminated as in Example 1.

(B) Same as A above except that TFE was 4-mil skived film, sodium-etched on one face as taught in U.S. Patent 2,789,063.

(C) Same as A above except that TFE sheet was sintered and sodium-etched prior to lamination.

(D) Commercially available product made by spraying blend of TFE powder and brown inorganic pigment on aluminum surface heated above TFE's sintering temperature.

These laminates were then subjected to a series of tests illustrative of conditions which might be encountered in actual use.

*Draw test.*—Several 2-inch (51 mm.) diameter discs were die-cut from the various laminates and subjected to a series of deep drawing operations, typical of those in which aluminum sheet is formed into cooking utensils. In this test the peripherally outer faces of a disc are firmly clamped, and a flat-faced cylindrical plunger with rounded edges is forced perpendicularly against the TFE-coated face at the rate of 3 inches (76 mm.) per minute. The plunger compels the disc blank to cold flow and the metal surface to conform a circular die, 0.04 inch (1 mm.) larger in diameter than the plunger, positioned at the metal face of the disc. As a result the disc acquires the shape of a tube having one open and one closed end, severity of draw being measured in percent blank reduction, i.e., $$\frac{\text{original disc diameter} - \text{tube inner diameter}}{\text{original tube diameter}} \times 100$$

(A suitable machine for use in draw testing is available from Tinius Olsen Testing Machine Co. under the trade designation "Ductomatic" sheet tester.) Stripback adhesion tests were run on the original laminates and also on strips cut from the walls of the drawn samples. Adhesion results are tabulated below in pounds per inch of width with letters referring to the laminates of the type referred to earlier in this example.

|  | Percent blank reduction | | | | |
| --- | --- | --- | --- | --- | --- |
|  | 0 | 25 | 50 | 60 | 70 |
| Laminate: | | | | | |
| A | 22 | 22 | 22 |  | 22 | 17 |
| B | 9 | 6.2 | 2.5 | | |
| C | 5 | 2 | | | |
| D | Good [1] | Good [1] | Good [1] | Good [1] | some cracking |

[1] TFE layer too thin to measure stripback adhesion.

*Stain test.*—This test indicates surface porosity, release characteristics, and the amount of TFE discoloration which occurs in normal contact with such substances as food. In this test a heptane solution of dye is coated on the laminate, allowed to stand briefly, and then an attempt made to remove it. Whereas the dye was easily removed from laminates A, B, and C with a dry cloth, it could not be removed from laminate D, even after scrubbing in hot, soapy, water. Microscopic examination revealed dye crystals lodged deep within the pores of laminate D, indicating the inferior stain-resistance of sprayed TFE coatings. Substantially the same results were obtained when markings were applied to the TFE with a felt-tipped marking pen. That staining is a problem with sprayed TFE coatings, is evidenced by the fact that all commercial products I have ever seen are pigmented to help obscure discoloration.

*Hot oil test.*—This test indicates both heat- and stain-resistance of a TFE-surfaced substrate. Samples of laminates A, B and D immersed in vegetable oil maintained at 450° F. were periodically inspected and tested for adhesion. Results were as follows:

|  | Time, hrs. | Discoloration | Adhesion, lbs./in. | |
| --- | --- | --- | --- | --- |
|  |  |  | Initial | Final |
| Laminate: | | | | |
| A | 730 | None | 22 | 20 |
| B | 48 | do | 9 | Delaminating. |
| D | 700 | Severe | Good [1] | Good [1] |

[1] TFE layer too thin to measure stripback adhesion.

*Weathering test.*—This test indicates the suitability of a laminate for outdoor use, e.g., for snow shovels, helicopter blades, or leading edges of airplane wings. Samples of laminates A, B, and D were placed in a "Weather-O-Meter" cabinet and alternately exposed to ultraviolet light and salt spray for 150 hours. Whereas the stripback adhesion of laminate A remained at its initial value of 22 lbs. per inch (4 kg./cm.) of width, laminate B had completely delaminated. Laminate D remained intact but showed signs of fading after only 16 hours.

Interestingly, it appears that whereas cooking pans surfaced with sprayed TFE necessitate the use of wooden or plastic spatulas, spoons, etc., to avoid scratching, tearing or excessive abrasion, conventional steel equipment can be used with pans made in accordance with the present invention.

EXAMPLE 3

A porous unsintered sheet of 10-mil (0.25-mm.) "3M" Type B PTFE film was immersed in a saturated solution of trimesic acid in ethanol, removed, and air dried to deposit crystalline acid in the pores. This process was repeated several times to substantially fill the pores. The film was then quickly sintered between platens heated to 730° F. (390° C.), cooled, and then was immersed in boiling ethanol to extract the trimesic acid. The resultant TFE sheet contained approximately 25% voids. This sheet was then substituted for the unsintered TFE sheet used in Example 1 and the laminating process repeated FEP-TFE adhesion was found to be 17 lbs. per inch (3 kg./cm.) of width. The TFE surface of the laminate was somewhat more porous than that of the product of Example 1.

EXAMPLE 4

A 3-ply sandwich of 5-mil (0.12 mm.) "Teflon" FEP film. Type A, between 3-mil (0.08-mm.) unsintered porous "3M" Type B PTFE film and 20-gauge (0.8 mm.) aluminum sheet was placed in a platen press at 730° F. (390° C.), 200 p.s.i. (14 kg./cm.²), for 5–10 seconds, after which the press was quickly cooled to 500° F. (260° C.) by blowing cool air through tubes in the platens, and then opening the press. After cooling, the FEP-TFE adhesion was found to be 20 lbs. per inch (3.6 kg./cm.) of width.

EXAMPLES 5–10

Using the same procedure described in Example 1, 3-mil (0.08 mm.) unsintered TFE film and 2-mil (0.05-mm.) FEP film, both of the type described in Example 4, were laminated to the following precleaned substrates: steel, stainless steel, copper-plated aluminum, zinc-plated aluminum, tin-plated aluminum, and brass. In each instance the FEP-TFE adhesion was approximately 20 lbs. per inch (3.6 kg./cm.), the FEP-substrate adhesion ranging between 10 and 15 lbs. per inch (1.8–2.7 kg./cm.), which is considered adequate. Adhesion of FEP to substrates can be enhanced by any of several well known cleaning or roughening procedures.

EXAMPLE 11

Unsintered fibroid 3-mil (0.08-mm.) TFE sheet was simultaneously sintered and laminated to 2-mil (0.05-mm.) FEP film in the laminator described in Example 1, at 750° F. (400° C.), 3 feet per minute, 90 lbs. per inch (16 kg./cm.) of laminate width. Both TFE and FEP were of the type used in Example 4. The resultant 2-ply laminate was then further laminated to a sintered aluminum oxide ceramic sheet (the FEP contacting the ceramic) in a platen press at 550° F. (290° C.) and 150 p.s.i. (10 kg./cm.²); after 10 seconds, the laminate was quickly cooled under pressure. FEP-TFE adhesion was 22 lbs. per inch (4 kg./cm.) of width, and FEP-ceramic adhesion was 15 lbs. per inch (2.7 kg./cm.). Pre-sintering of the TFE film during its lamination to the FEP permitted the use of lower temperature and pressure in the lamination of the 2-ply structure to the ceramic substrate.

EXAMPLE 12

Five-mil (0.12 mm.) FEP film was laminated to precleaned and abraded aluminum sheet in a platen press at 575° F. (300° C.) and 200 p.s.i. (14 kg./cm.²), and thereafter cooled under pressure, as described in Example 4. A 3-ply laminate was then formed by placing a 3-mil (0.08-mm.) unsintered fibroid sheet of TFE in contact with the FEP and passing the assembly through the laminator described in Example 1, all operating parameters being the same as in Example 1 except that the heated roll was maintained at 755° F. (400 C.). Both TFE and FEP were of the type used in Example 4. Adhesion of the FEP to both the TFE and the aluminum was found to be 20 lbs. per inch (3.6 kg./cm.) of width.

EXAMPLE 13

A 3-ply laminate of unsintered porous fibroid 3-mil (0.08-mm.) TFE sheet, FEP film (both as described in Example 4), and aluminum sheet was formed in the laminator of Example 1, the temperature of the heated roll being maintained at 500° F. (260° C.), well below the 700–720° F. (370–380° C.) temperature required to sinter TFE. The resultant laminate was then further treated by playing a flame lightly over the TFE surface, thereby sintering the TFE without excessively softening the FEP. Adhesion of the FEP to both TFE and aluminum was approximately 20 lbs. per inch (3.6 kg./cm.). This manner of forming a TFE-faced substrate, like that of Example 11, permits the use of laminating adhesives which are deleteriously affected by temperatures required to sinter TFE.

If a film of thermoplastic polymer is employed as a laminating adhesive in the practice of the present invention, its melt viscosity should be low enough to insure a degree of flow which will permit migration into the porous TFE film under the conditions of lamination. On the other hand, its melt viscosity should not be so low that the adhesive is actually squeezed out during lamination. Likewise, the melting point of such a thermoplastic adhesive should be high enough to withstand the sintering temperature of TFE, at least for short periods of time; the adhesive should also, of course, be capable of resisting melting at the temperatures to which the laminate will be exposed during use.

Generally speaking, a perfluorinated polymer wets TFE more effectively than do other laminating polymers and hence is preferred for joining TFE to a substrate. FEP is commercially available as an approximately 87:13 (mole ratio) tetrafluoroethylene:hexafluoropropylene copolymer having a fusion temperature of about 520° F. (270° C.) and a melt viscosity of about 30,000 poises. Increasing the ratio increases the melt viscosity on a logarithmic basis, while decreasing the ratio lowers the melt viscosity in the same manner. The melting point of FEP is inversely related to the amount of hexafluoropropylene in the copolymer.

It will be appreciated that other adhesive resins, although presently considered less preferred than the thermoplastic perfluoropolymers, may also find utility as laminating adhesives, bearing in mind the bases for selection previously discussed. Among such resins may be listed polyarylsulfone, polyimide-amide systems, epoxies, polychlorotrifluoroethylene, polyphenylene oxide, etc.

Laminates made in accordance with the invention may be corrugated, stamped, bent, riveted, perforated and otherwise formed or shaped without ply separation. The unusual combination of properties possessed by these laminates immediately suggests utility in a wide variety of fields. In addition to the applications listed above, and without intending to be restrictive, these laminates will be found useful in the manufacture of chute and conveyor linings, e.g., for transporting ammunition or readily abradable pharmaceutical tablets, candymakers' tables and knives, spray booth linings, oven linings, hatch linings on paratroop planes, press platens, heat sealing press bars, gaskets, sole plates for electric irons, ski surfaces, chemical containers, mold liners and release applications, paint brush ferrules, valve linings, baking trays and molds, extrusion dies, feed troughs and hoppers, glue and resin kettle linings and mixing equipment, bearings, printing presses, roller coatings, and electrical insulation.

What I claim is:

1. The continuous method of providing a substrate with a tightly bonded heat-resistant, inert substantially void-free continuous sintered surface of polytetrafluoroethylene which comprises the steps of superposing an unsintered fibroid void-containing polytetrafluoroethylene first film, a polyperfluoro(ethylene:propylene) second film and a substrate to form a three-ply assembly in which said second film is sandwiched between said first film and said substrate, and continuously passing the three-ply assembly between a resilient roll and a roll heated to at least 700° F. while subjecting said assembly to pressure imposed by said rolls, so as to cause said second film to migrate into the voids in that face of said first film which is adjacent said second film and also to cause said second film to bond firmly to said substrate, simultaneously sintering said first film so as to substantially eliminate all voids therein other than those occupied by said second film.

2. The method of claim 1 wherein the substrate is metallic.

3. The method of claim 2 wherein the substrate is sheet aluminum.

4. The continuous method of making a firmly bonded laminate comprising sintered polytetrafluoroethylene film and heat-flowable hexafluoropropylene:tetrafluoroethylene copolymer film, comprising superposing a sheet of void-containing unsintered fibroid polytetrafluoroethylene and a film of said copolymer to form a laminate, and passing said laminate between a resilient roll and a roll heated to at least 700° F. to cause said copolymer film to melt and a portion thereof to migrate into the voids and that face of said sheet adjacent said film, and sintering said sheet to eliminate substantially all voids therein other than those occupied by said second film.

References Cited

UNITED STATES PATENTS

| | | | |
|---|---|---|---|
| 2,731,068 | 1/1956 | Richards | 156—324 |
| 2,833,686 | 5/1958 | Sandt | 161—189 XR |
| 2,989,433 | 6/1961 | Yuan | 161—189 XR |
| 3,136,680 | 6/1964 | Hochberg | 161—189 |
| 3,356,551 | 12/1967 | Glenn | 161—189 |

HAROLD ANSHER, Primary Examiner

J. D. SMITH, Assistant Examiner

U.S. Cl. X.R.

156—324; 161—189